(12) United States Patent
Jung et al.

(10) Patent No.: US 8,134,627 B2
(45) Date of Patent: Mar. 13, 2012

(54) DIGITAL PHOTOGRAPHING APPARATUS AND METHOD OF OPERATING IMAGE PICKUP DEVICE

(75) Inventors: Gi-woung Jung, Changwon (KR); Kyoung-shin Kim, Changwon (KR); Inh-seok Suh, Changwon (KR); Shinri Takahashi, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 579 days.

(21) Appl. No.: 12/316,468

(22) Filed: Dec. 12, 2008

(65) Prior Publication Data

US 2009/0153719 A1    Jun. 18, 2009

(30) Foreign Application Priority Data

Dec. 13, 2007    (KR) .................. 10-2007-0130251

(51) Int. Cl.
*H04N 5/335* (2011.01)
(52) U.S. Cl. .................. 348/311; 348/317; 348/322
(58) Field of Classification Search .................. 348/248, 348/294, 298, 311, 315, 316, 317, 322, 324, 348/340, E5.091; 257/231, 232, 240, 241, 257/242
See application file for complete search history.

(56) References Cited

U.S. PATENT DOCUMENTS 5,612,739 A *  3/1997  Maki et al. .................. 348/311
6,967,685 B2 * 11/2005  Hamasaki .................. 348/314

FOREIGN PATENT DOCUMENTS

KR    1998-0007528 A    3/1998
KR    10-2006-0079730 A    7/2006

* cited by examiner

*Primary Examiner* — Huy K Mai
(74) *Attorney, Agent, or Firm* — Drinker Biddle & Reath LLP

(57) ABSTRACT

A digital photographing apparatus and a method of operating an image pickup device reduce generation of smear. The image pickup device includes a matrix of photoelectric converters which generate charges from incident light, vertical transfer paths for reading charges generated in the photoelectric converters and for transferring the read charges in a vertical direction, and a horizontal transfer path for transferring the charges on the vertical transfer paths in a horizontal direction. The method includes: applying vertical and horizontal transfer signals for causing the charges generated in photoelectric converters defining a subset of rows of the photoelectric converters to be read by the vertical transfer paths and to be transferred in the horizontal direction along the horizontal transfer path; and providing a predetermined period of time in which the horizontal transfer signals are not applied to the horizontal transfer path while charges are being transferred to the horizontal transfer path.

19 Claims, 9 Drawing Sheets ions apparatus and method of operating image pickup device

CROSS-REFERENCE TO RELATED PATENT APPLICATION

This application claims the benefit of Korean Patent Application No. 10-2007-0130251, filed on Dec. 13, 2007, in the Korean Intellectual Property Office, the disclosure of which is incorporated herein in its entirety by reference.

BACKGROUND OF THE INVENTION

1. Field of the Invention

The present invention relates generally to a digital photographing apparatus. More particularly the present invention relates to a method of operating an image pickup device of a digital photographing apparatus for reducing generation of smear while decreasing power consumption.

2. Description of the Related Art

A digital photographing apparatus includes an image pickup device that generates an electric signal from an incident light. The digital photographing apparatus further includes a display for displaying an image corresponding to the electric signal which is generated by the image pickup device. The digital photographing apparatus can preview an image of an object by using the display as a viewfinder, and adjust composition in a preview mode for acquiring a still image. The preview mode displays a real-time moving image of an object on the display of the digital photographing apparatus. That is, a user determines the composition of a picture while watching the real-time moving image of the object that is being displayed on the display, and takes a picture of the object. When a moving image (i.e., movie) is acquired using the digital photographing apparatus (e.g., using a moving picture mode), the user also determines the composition of the moving image while watching the real-time moving image of the object that is being displayed on the display, and takes a picture of the object.

However, in a conventional digital photographing apparatus and a conventional method of operating an image pickup device, when a real-time moving image of an object is displayed on a display of the conventional digital photographing apparatus in the preview mode for acquiring a still image (or the real-time moving image is displayed on the display in order to acquire a moving image), the image pickup device generates a large number of electric signals which are processed in the displaying operation. Accordingly, power consumption increases or smear generated in the image pickup device deteriorates the quality of the real-time moving image displayed on the display.

SUMMARY OF THE INVENTION

The present invention provides a digital photographing apparatus and a method of operating an image pickup device for reducing generation of smear while decreasing power consumption.

According to an aspect of the present invention, there is provided a method of operating an image pickup device. An example image pickup device comprises photoelectric converters arranged in a matrix for converting incident light into charges, and vertical transfer paths arranged on one side of each of columns of the photoelectric converters for reading charges generated in the photoelectric converters and transferring the read charges in a vertical direction, and a horizontal transfer path electrically connected to one end of each of the vertical transfer paths for transferring the charges transferred from the vertical transfer paths in a horizontal direction. The method of operating the image pickup device comprises: for each frame in a mode of acquiring moving image information from charges generated in photoelectric converters belonging to a subset of rows of the photoelectric converters of the image pickup device, applying horizontal transfer signals, which instruct the charges generated in the photoelectric converters belonging to the subset of the rows of the photoelectric converters and read by the vertical transfer paths to be transferred in the horizontal direction, to the horizontal transfer path when the charges are transferred to the horizontal transfer path; and providing a predetermined period of time during which the horizontal transfer signals are not applied to the horizontal transfer path while charges are being transferred to the horizontal transfer path after the charges generated in the photoelectric converters belonging to the subset of the rows of the photoelectric converters and read by the vertical transfer paths are transferred in the horizontal direction through the horizontal transfer path.

The step of applying of the horizontal transfer signals may comprise: applying a field transfer signal, which instructs the charges generated in the photoelectric converters belonging to the subset of the rows of the photoelectric converters to be read by the vertical transfer paths, between the photoelectric converters belonging to the subset of the rows and the vertical transfer paths; applying a vertical transfer signal, which instructs charges existing in close proximity to the horizontal transfer path from among the charges transferred to the vertical transfer paths to be transferred to the horizontal transfer path, to the vertical transfer paths; and applying the horizontal transfer signals, which instruct the charges transferred to the horizontal transfer path to be transferred in the horizontal direction, to the horizontal transfer path, wherein the applying of the vertical transfer signal and the applying of the horizontal transfer signals are repeated until the transfer of the charges read by the vertical transfer paths in the horizontal direction through the horizontal transfer path is completed.

The step of providing the predetermined period of time in which the horizontal transfer signals are not applied to the horizontal transfer path may comprise providing a period in which the horizontal transfer signals are not applied to the horizontal transfer path for the predetermined period of time even though charges are transferred to the horizontal transfer path while the vertical transfer signal, which instructs the charges read by the vertical transfer paths to be transferred to the horizontal transfer path, is applied to the vertical transfer paths for the predetermined period of time after the transfer of the charges read by the vertical transfer paths in the horizontal direction through the horizontal transfer path is completed.

The method may further comprise applying horizontal transfer signals, which instruct the charges transferred to the horizontal transfer path to be transferred in the horizontal direction, to the horizontal transfer path for a period in which the horizontal transfer signals are not applied to the horizontal transfer path before the frame is finished after the lapse of the predetermined period of time.

A period of time from when the frame is started to when the transfer of the charges generated in the photoelectric converters belonging to the some of the rows and read by the vertical transfer paths in the horizontal direction through the horizontal transfer path is completed may correspond to half a time from when the frame is started to when the frame is ended.

According to another aspect of the present invention, there is provided a method of operating an image pickup device comprising photoelectric converters arranged in a matrix and converting incident light into charges, vertical transfer paths arranged on one side of each of columns of the photoelectric converters, reading charges generated in the photoelectric converters and transferring the read charges in a vertical direction, and a horizontal transfer path electrically connected to one end of each of the vertical transfer paths and transferring the charges transferred from the vertical transfer paths in a horizontal direction, wherein, for each frame in a mode of acquiring moving image information from charges generated in photoelectric converters belonging to a subset of rows of the photoelectric converters of the image pickup device, horizontal transfer signals, which instruct the charges generated in the photoelectric converters belonging to the subset of rows of the photoelectric converters and read by the vertical transfer paths to be transferred in the horizontal direction, are applied to the horizontal transfer path when the charges are transferred to the horizontal transfer path, and the horizontal transfer signals are not applied to the horizontal transfer path for a predetermined period of time when charges that are not read by the vertical transfer paths are transferred to the horizontal transfer path.

The horizontal transfer signals are not applied to the horizontal transfer path for the predetermined period of time when only the charges that are not read by the vertical transfer paths are transferred to the horizontal transfer path.

The charges generated in the photoelectric converters belonging to the subset of rows and read by the vertical transfer paths may be transferred to the horizontal transfer path by applying a vertical transfer signal, which instructs charges existing in close proximity to the horizontal transfer path from among the charges transferred to the vertical transfer paths to be transferred to the horizontal transfer path, to the vertical transfer paths.

The charges that are not read by the vertical transfer paths may be transferred to the horizontal transfer path by applying a vertical transfer signal, which instructs charges existing in the vertical transfer paths to be transferred to the horizontal transfer path, to the vertical transfer paths for the predetermined period of time.

Horizontal transfer signals, which instruct the charges transferred to the horizontal transfer path to be transferred in the horizontal direction, may be applied to the horizontal transfer path for a period in which the horizontal transfer signals are not applied to the horizontal transfer path before the frame is finished after the lapse of the predetermined period of time.

A period of time from when the frame is started to when the transfer of the charges generated in the photoelectric converters belonging to the subset of rows and read by the vertical transfer paths in the horizontal direction through the horizontal transfer path is completed may correspond to half a time from when the frame is started to when the frame is ended.

According to another aspect of the present invention, there is provided a digital photographing apparatus comprising: a lens through which light passes; an image pickup device including photoelectric converters arranged in a matrix and converting incident light input through the lens into charges, vertical transfer paths arranged on one side of each of columns of the photoelectric converters for reading charges generated in the photoelectric converters and transferring the read charges in a vertical direction, a horizontal transfer path electrically connected to one end of each of the vertical transfer paths and transferring the charges transferred from the vertical transfer paths in a horizontal direction, and a signal output unit converting the charges transferred from the horizontal transfer path into an electric signal; a signal processor processing the electric signal output from the signal output unit of the image pickup device; and an image pickup device driver controlling the operation of the image pickup device, wherein the image pickup device driver controls the operation of the image pickup device through a method comprising steps of applying horizontal transfer signals, which instruct the charges generated in photoelectric converters belonging to a subset of rows of the photoelectric converters and read by the vertical transfer paths to be transferred in the horizontal direction, to the horizontal transfer path when the charges are transferred to the horizontal transfer path; and providing a period in which the horizontal transfer signals are not applied to the horizontal transfer path for a predetermined period of time even though charges are transferred to the horizontal transfer path after the charges generated in the photoelectric converters belonging to the subset of rows of the photoelectric converters and read by the vertical transfer paths are transferred in the horizontal direction through the horizontal transfer path, for each frame in a mode of acquiring moving image information from the charges generated in the photoelectric converters belonging to the subset of rows of the photoelectric converters of the image pickup device.

The step of applying the horizontal transfer signals may comprise: applying a field transfer signal, which instructs the charges generated in the photoelectric converters belonging to the subset of rows of the photoelectric converters to be read by the vertical transfer paths, between the photoelectric converters belonging to the subset of rows and the vertical transfer paths; applying a vertical transfer signal, which instructs charges existing in close proximity to the horizontal transfer path from among the charges transferred to the vertical transfer paths to be transferred to the horizontal transfer path, to the vertical transfer paths; and applying the horizontal transfer signals, which instruct the charges transferred to the horizontal transfer path to be transferred in the horizontal direction, to the horizontal transfer path, wherein the applying of the vertical transfer signal and the applying of the horizontal transfer signals are repeated until the transfer of the charges read by the vertical transfer paths in the horizontal direction through the horizontal transfer path is completed.

The step of providing of the period in which the horizontal transfer signals are not applied to the horizontal transfer path for a predetermined period of time may comprise providing a period in which the horizontal transfer signals are not applied to the horizontal transfer path for the predetermined period of time even though charges are transferred to the horizontal transfer path while the vertical transfer signal, which instructs the charges read by the vertical transfer paths to be transferred to the horizontal transfer path, is applied to the vertical transfer paths for the predetermined period of time after the transfer of the charges read by the vertical transfer paths in the horizontal direction through the horizontal transfer path is completed.

The method may further comprise applying horizontal transfer signals, which instruct the charges transferred to the horizontal transfer path to be transferred in the horizontal direction, to the horizontal transfer path for a period in which the horizontal transfer signals are not applied to the horizontal transfer path before the frame is finished after the lapse of the predetermined period of time.

A period of time from when the frame is started to when the transfer of the charges generated in the photoelectric converters belonging to the subset of rows and read by the vertical transfer paths in the horizontal direction through the horizontal transfer path is completed may correspond to half a time from when the frame is started to when the frame is ended.

According to another aspect of the present invention, there is provided a digital photographing apparatus comprising: a lens through which light passes; an image pickup device including photoelectric converters arranged in a matrix and converting incident light input through the lens into charges, vertical transfer paths arranged on one side of each of columns of the photoelectric converters, reading charges generated in the photoelectric converters and transferring the read charges in a vertical direction, a horizontal transfer path electrically connected to one end of each of the vertical transfer paths and transferring the charges transferred from the vertical transfer paths in a horizontal direction, and a signal output unit converting the charges transferred from the horizontal transfer path into an electric signal; a signal processor processing the electric signal output from the signal output unit of the image pickup device; and an image pickup device driver controlling the operation of the image pickup device, wherein, for each frame in a mode of acquiring moving image information from charges generated in photoelectric converters belonging to a subset of rows of the photoelectric converters of the image pickup device, the image pickup device driver applies horizontal transfer signals, which instruct the charges generated in the photoelectric converters belonging to the subset of rows of the photoelectric converters and read by the vertical transfer paths to be transferred in the horizontal direction, to the horizontal transfer path when the charges are transferred to the horizontal transfer path and does not apply the horizontal transfer signals to the horizontal transfer path for a predetermined period of time when charges that are not read by the vertical transfer paths are transferred to the horizontal transfer path.

The image pickup device driver may not apply the horizontal transfer signals to the horizontal transfer path for the predetermined period of time when only the charges that are not read by the vertical transfer paths are transferred to the horizontal transfer path.

The charges generated in the photoelectric converters belonging to the subset of rows and read by the vertical transfer paths may be transferred to the horizontal transfer path by applying a vertical transfer signal, which instructs charges existing in close proximity to the horizontal transfer path from among the charges transferred to the vertical transfer paths to be transferred to the horizontal transfer path, to the vertical transfer paths.

The charges that are not read by the vertical transfer paths may be transferred to the horizontal transfer path by applying a vertical transfer signal, which instructs charges existing in the vertical transfer paths to be transferred to the horizontal transfer path, to the vertical transfer paths for the predetermined period of time.

The image pickup device driver may apply horizontal transfer signals, which instruct the charges transferred to the horizontal transfer path to be transferred in the horizontal direction, to the horizontal transfer path for a period in which the horizontal transfer signals are not applied to the horizontal transfer path before the frame is finished after the lapse of the predetermined period of time.

A period of time from when the frame is started to when the transfer of the charges generated in the photoelectric converters belonging to the subset of rows and read by the vertical transfer paths in the horizontal direction through the horizontal transfer path is completed may correspond to half a time from when the frame is started to when the frame is ended.

The digital photographing apparatus and the method of operating an image pickup device can reduce generation of smear while decreasing power consumption.

DETAILED DESCRIPTION

Figure 1:
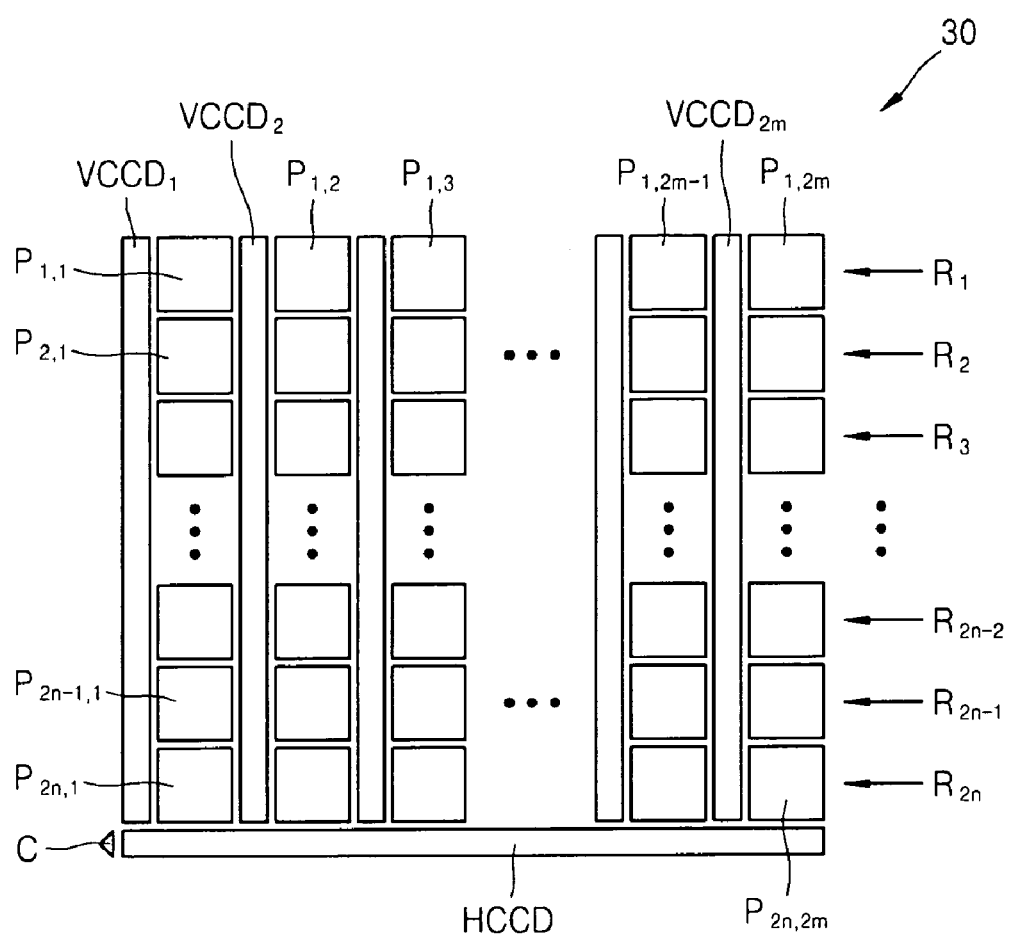
FIG. 1 is a plan view of an image pickup device included in a digital photographing apparatus according to an embodiment of the present invention.

The present method and apparatus will now be described more fully with reference to the accompanying drawings, in which exemplary embodiments are shown. The present method and apparatus may, however, be embodied in many different forms and should not be construed as being limited to the embodiments set forth herein. Throughout the drawings, like reference numerals refer to like elements.

FIG. 1 is a plan view of an image pickup device 30 included in a digital photographing apparatus according to an embodiment of the present invention. Referring to FIG. 1, the image pickup device 30 includes photoelectric converters $P_{1,1}$, $P_{1,2}$, ..., $P_{2n,2m}$, vertical transfer paths $VCCD_1$, $VCCD_2$, ..., $VCCD_{2m}$, a horizontal transfer path HCCD, and a signal processor C.

The photoelectric converters $P_{1,1}$, $P_{1,2}$, ..., $P_{2n,2m}$ are arranged in a 2n×2m matrix, for example, and generate charges according to the intensity of incident light. Each of the vertical transfer paths $VCCD_1$, $VCCD_2$, ..., $VCCD_{2m}$ is located on one side of columns (e.g., the left sides as shown) of the photoelectric converters $P_{1,1}$, $P_{1,2}$, ..., $P_{2n,2m}$, for reading charges generated in neighboring photoelectric converters and transferring the read charges in a vertical direction. For example, the vertical transfer path $VCCD_1$ reads charges generated in the photoelectric converters $P_{1,1}$, $P_{2,1}$, ..., $P_{2n,1}$ (i.e., the left-most column of photoelectric converters adjacent to the vertical transfer path $VCCD_1$) and transfers the read charges in the vertical direction. The vertical transfer path $VCCD_2$ reads charges generated in the photoelectric converters $P_{1,2}$, $P_{2,2}$, ..., $P_{2n,2}$ and transfers the read charges in the vertical direction. The horizontal transfer path HCCD is electrically connected to one end of each of the vertical transfer paths $VCCD_1$, $VCCD_2$, ..., $VCCD_{2m}$ and transfers charges from the vertical transfer paths $VCCD_1$, $VCCD_2$, ..., $VCCD_{2m}$ in a horizontal direction. The signal processor C generates an electric signal such as a voltage corresponding to the quantity of charges transferred from the horizontal transfer path HCCD.

Charges generated in the photoelectric converters $P_{1,1}$, $P_{1,2}$, ..., $P_{2n,2m}$ may be simultaneously read by the vertical transfer paths $VCCD_1$, $VCCD_2$, ..., $VCCD_{2m}$ according to a field transfer signal. Charges generated in some of the photoelectric converters $P_{1,1}$, $P_{1,2}$, ... $P_{2n,2m}$ may be read by the vertical transfer paths $VCCD_1$, $VCCD_2$, ..., $VCCD_{2m}$. For example, only charges generated in photoelectric converters $P_{2,1}$, $P_{2,2}$, ..., $P_{2,2m}$, $P_{4,1}$, $P_{4,2}$, ..., $P_{2n,2m}$ defining the even-numbered rows $R_2$, $R_4$, ..., $R_{2n}$ may be simultaneously read by the vertical transfer paths $VCCD_1$, $VCCD_2$, ..., $VCCD_{2m}$. An instance where charges generated in all the photoelectric converters $P_{1,1}, P_{1,2}, \ldots, P_{2n,2m}$ are read by the vertical transfer paths $VCCD_1, VCCD_2, \ldots, VCCD_{2m}$ will now be explained.

The vertical transfer paths $VCCD_1, VCCD_2, \ldots, VCCD_{2m}$ transfer the read charges in the vertical direction according to a vertical transfer signal. Specifically, charges nearest to the horizontal transfer path HCCD from among the charges read by the vertical transfer paths $VCCD_1, VCCD_2, \ldots, VCCD_{2m}$ are transferred to the horizontal transfer path HCCD according to a single vertical transfer signal. That is, the charges generated in the photoelectric converters $P_{2n,1}, P_{2n,2}, \ldots, P_{2n,2m}$ (i.e., the bottom-most row of photoelectric converters) and which are read by the vertical transfer paths $VCCD_1, VCCD_2, \ldots, VCCD_{2m}$ are transferred to the horizontal transfer path HCCD according to a first vertical transfer signal.

After the charges are transferred to the horizontal transfer path HCCD according to the first vertical transfer signal, the horizontal transfer path HCCD then transfers the charges in the horizontal direction according to a horizontal transfer signal. Accordingly, the charges generated in the photoelectric converters $P_{2n,1}, P_{2n,2}, \ldots, P_{2n,2m}$ are transferred to the signal processor C through the horizontal transfer path HCCD. The signal processor C generates an electric signal such as a voltage corresponding to the quantity of charges transferred from the horizontal transfer path HCCD. Charges generated in a single photoelectric converter are transferred to the signal processor C according to a single horizontal transfer signal. Accordingly, a quantity of 2m horizontal transfer signals is required to transfer all the charges generated in the photoelectric converters $P_{2n,1}, P_{2n,2}, \ldots, P_{2n,2m}$ to the signal processor C through the horizontal transfer path HCCD.

When a second vertical transfer signal is applied to the vertical transfer paths $VCCD_1, VCCD_2, \ldots, VCCD_{2m}$, charges nearest to the horizontal transfer path HCCD from among charges, which exist in the vertical transfer paths $VCCD_1, VCCD_2, \ldots, VCCD_{2m}$ when the second vertical transfer signal is applied, are transferred to the horizontal transfer path HCCD. That is, charges generated in the photoelectric converters $P_{2n-1,1}, P_{2n-1,2}, \ldots, P_{2n-1,2m}$ (i.e., the row above the bottom-most row) and read by the vertical transfer paths $VCCD_1, VCCD_2, \ldots, VCCD_{2m}$ are transferred to the horizontal transfer path HCCD according to the second vertical transfer signal, and then transferred in the horizontal direction. This operation is repeated to transfer the charges generated in the photoelectric converters $P_{1,1}, P_{1,2}, \ldots, P_{2n,2m}$ to the signal processor C through the vertical transfer paths $VCCD_1, VCCD_2, \ldots, VCCD_{2m}$ and the horizontal transfer path HCCD. When only charges generated in the photoelectric converters $P_{2,1}, P_{2,2}, \ldots, P_{2,2m}, P_{4,1}, P_{4,2}, \ldots, P_{2n,2m}$ which belong to the even-numbered rows $R_2, R_4, \ldots, R_{2n}$ are read by the vertical transfer paths $VCCD_1, VCCD_2, \ldots, VCCD_{2m}$, charges generated in photoelectric converts $P_{2n-2,1}, P_{2n-2,2}, \ldots, P_{2n-2,2m}$ and read by the vertical transfer paths $VCCD_1, VCCD_2, \ldots, VCCD_{2m}$ are transferred to the horizontal transfer path HCCD according to the second vertical transfer signal.

Figure 2:
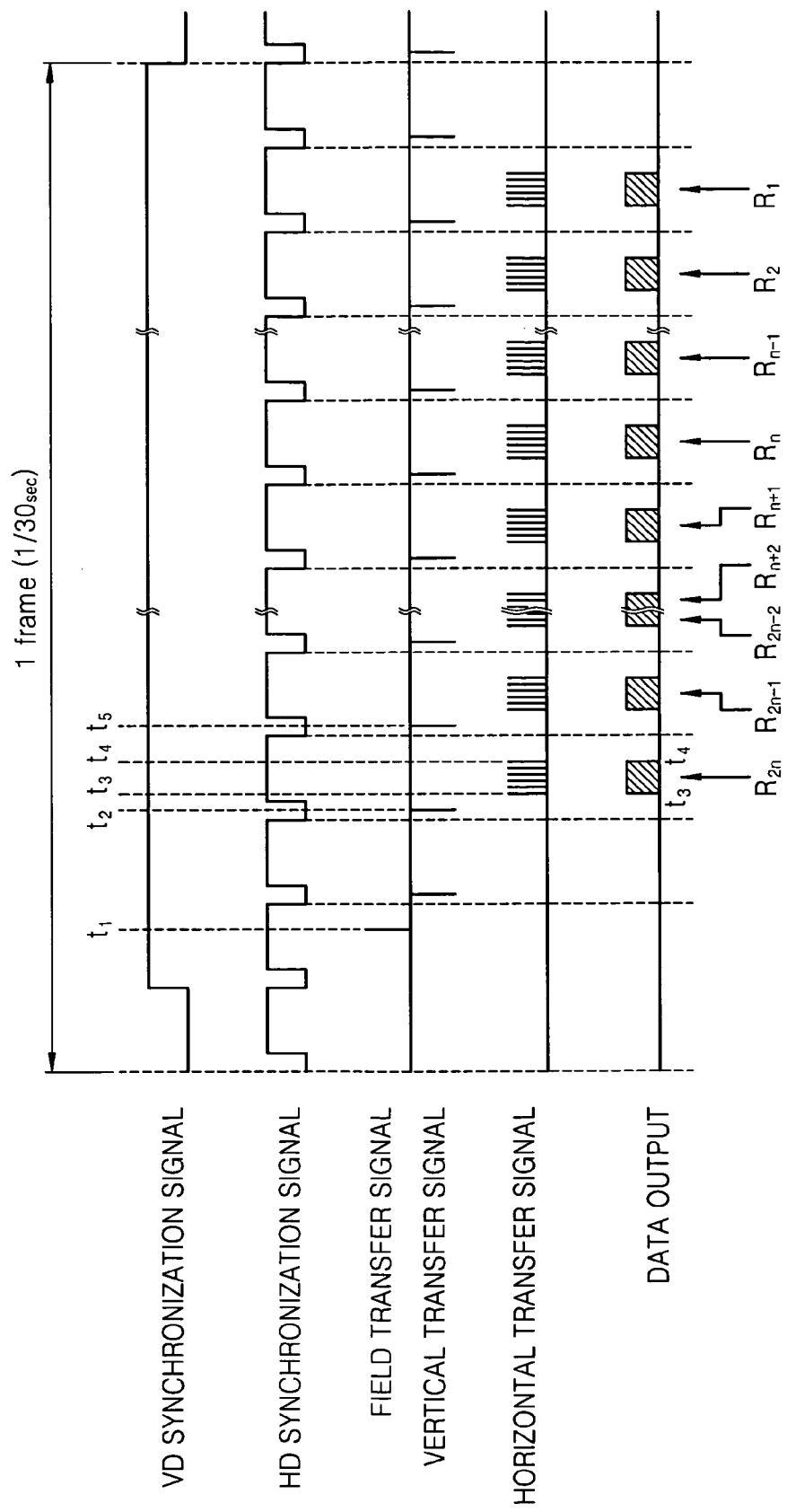
FIGS. 2-5 illustrate timing diagrams explaining conventional methods of operating an image pickup device.

FIG. 2 is a timing diagram for explaining a conventional method of operating an image pickup device for comparison with the present method. A digital photographing apparatus can take a picture of an object in a preview mode to acquire a still image. The preview mode displays a real-time low-quality moving image of the object on a display included in the digital photographing apparatus. That is, a user uses the display as a viewfinder to determine the composition of a picture of the object by watching the real-time low-quality moving image displayed on the display before taking a picture of the object. Even when the user acquires a high-quality moving image of the object using the digital photographing apparatus, the user determines the composition of a picture of the object using the real-time low-quality moving image displayed on the display and takes a picture of the object. The real-time low-quality moving image is displayed on the display of the digital photographing apparatus because the display has a small size. FIG. 2 is a timing diagram of signals in a case where charges generated in all the photoelectric converters $P_{1,1}, P_{1,2}, \ldots, P_{2n,2m}$ illustrated in FIG. 1 are read by the vertical transfer paths $VCCD_1, VCCD_2, \ldots, VCCD_{2m}$ illustrated in FIG. 1. FIG. 2 can be regarded as a timing diagram of signals in a case where some (e.g., a subset of rows) of the photoelectric converters are read by the vertical transfer paths. In the latter case, it can be considered that the photoelectric converters $P_{1,1}, P_{1,2}, \ldots, P_{2n,2m}$ illustrated in FIG. 1 correspond to some of the overall photoelectric converters of the image pickup device 30 and photoelectric converters from which charges are not read by the vertical transfer paths $VCCD_1, VCCD_2, \ldots, VCCD_{2m}$ in a case where a low-quality moving image is displayed on the display of the digital photographing apparatus are omitted between neighboring rows of the photoelectric converters $P_{1,1}, P_{1,2}, \ldots, P_{2n,2m}$ illustrated in FIG. 1. This is consistent throughout the following comparative examples and embodiments.

FIG. 2 illustrates a conventional operation of displaying a moving image of thirty frames per second on the display. Referring to FIG. 2, a frame is started when a vertical data VD synchronization signal varies or transitions from low to high. A horizontal data HD synchronization signal synchronizes transfer of charges generated in photoelectric converters corresponding to one row in the horizontal direction with multiple horizontal transfer signals.

When the frame is started, a field transfer signal is applied at a time $t_1$ such that the vertical transfer paths $VCCD_1, VCCD_2, \ldots, VCCD_{2m}$ read charges generated in the photoelectric converters $P_{1,1}, P_{1,2}, \ldots, P_{2n,2m}$. Then, a vertical transfer signal is applied at a time $t_2$ to transfer charges nearest to the horizontal transfer path HCCD to the horizontal transfer path HCCD. Multiple horizontal transfer signals are applied to the horizontal transfer path HCCD during a duration from time $t_3$ to time $t_4$ for transferring the charges transferred to the horizontal transfer path HCCD to the signal processor C. Although FIG. 2 illustrates that six horizontal transfer signals are applied between time $t_3$ to time $t_4$ for convenience of illustration, the number of horizontal transfer signals can correspond to the number of photoelectric converters belonging to a single row. Of course, the number of horizontal transfer signals can correspond to the number of a subset of photoelectric converters belonging to a single row. This is because a vertical transfer path VCCD may be configured to read only charges generated in some of the photoelectric converters belonging to the single row. This is consistent throughout the following comparative examples and embodiments. In FIG. 2, the bottom portion of the diagram indicated by "DATA OUTPUT" conceptually represents time periods when electric signals such as data are output from the signal processor C.

A vertical transfer signal is applied to the vertical transfer paths $VCCD_1, VCCD_2, \ldots, VCCD_{2m}$ at a time $t_5$ to transfer charges nearest to the horizontal transfer path HCCD to the horizontal transfer path HCCD through the aforementioned operation. The charges nearest to the horizontal transfer path HCCD at the time $t_5$ correspond to charges generated in photoelectric converters $P_{2n-1,1}, P_{2n-1,2}, \ldots, P_{2n-1,2m}$ belonging to another row. According to this operation, additional data is acquired.

As described above, a real-time low-quality moving image of an object is displayed on the display of the digital photographing apparatus and a user sets the composition for a still image or a moving image of the object using the real-time low-quality moving image to capture the still image or the moving image. Accordingly, there is no need to acquire data from charges generated in all the photoelectric converters $P_{1,1}, P_{1,2}, \ldots, P_{2n,2m}$ illustrated in FIG. 1. In a case where the photoelectric converters $P_{1,1}, P_{1,2}, \ldots, P_{2n,2m}$ illustrated in FIG. 1 correspond to some of the overall photoelectric converters of the image pickup device 30 illustrated in FIG. 1 and it is considered that photoelectric converters from which charges are not read by the vertical transfer paths $VCCD_1$, $VCCD_2, \ldots, VCCD_{2m}$ in a case where the real-time low-quality moving image of the object is displayed on the display of the digital photographing apparatus are omitted between neighboring rows of the photoelectric converters $P_{1,1}$, $P_{1,2}, \ldots, P_{2n,2m}$ as described above, there is also no need to acquire data from the charges generated in all the photoelectric converters $P_{1,1}, P_{1,2}, \ldots, P_{2n,2m}$ illustrated in FIG. 1. That is, when the image pickup device included in the digital photographing apparatus has a maximum resolution of XVGA grade (1024×768) and FIG. 1 illustrates only some of photoelectric converters of the image pickup device for capturing a real-time low-quality moving image with a VGA-grade resolution, even an HVGA-grade resolution (640×240) or the VGA grade may be sufficient for a real-time low-quality moving image actually displayed on the display of the digital photographing apparatus. In this case, there is no need to acquire data from the charges generated in all the photoelectric converters illustrated in FIG. 1. Accordingly, a problem that power consumption increases can occur when the method of operating an image pickup device according to the comparative example illustrated in FIG. 2 is used.

Figure 3:
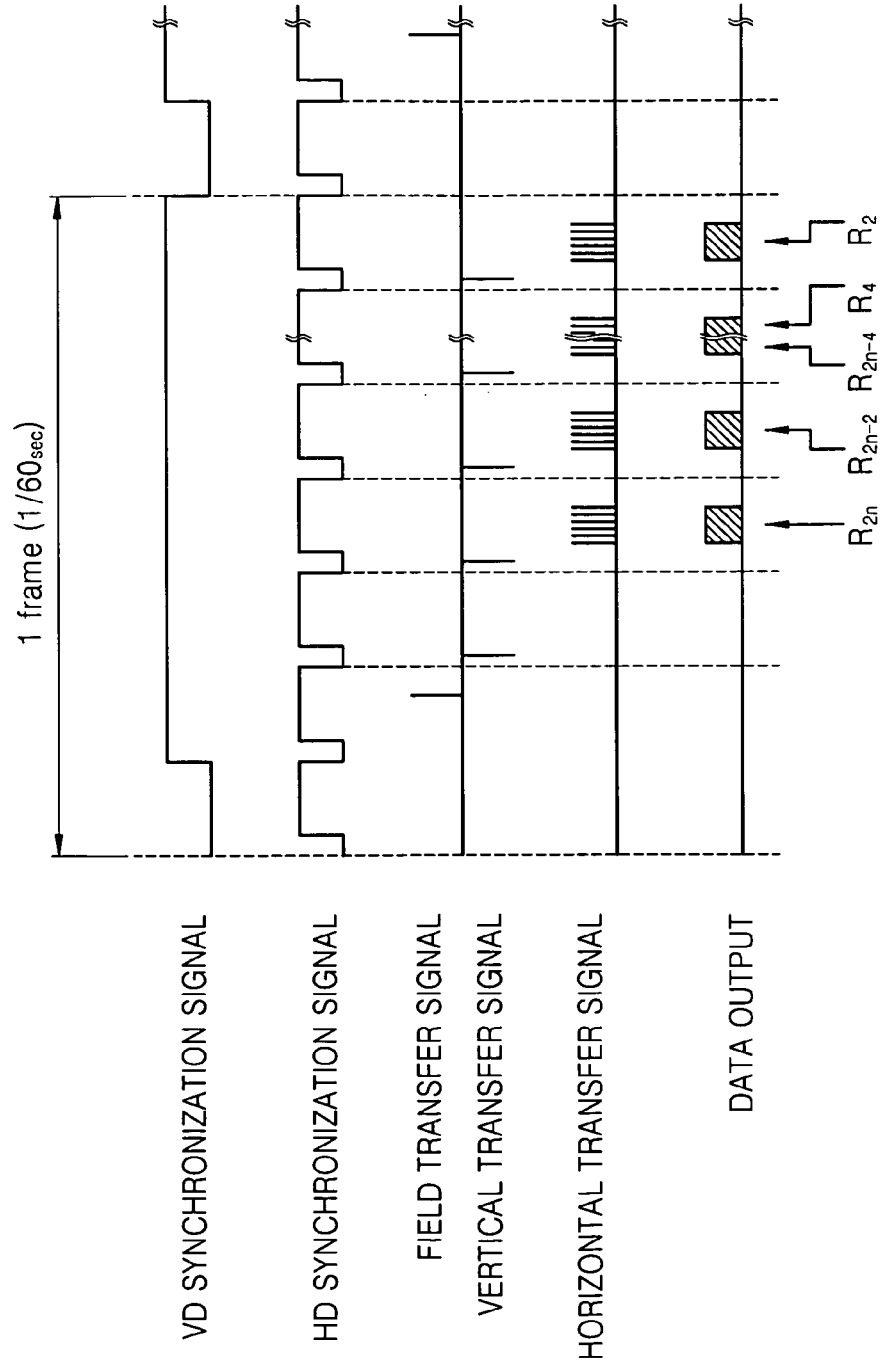

FIG. 3 is a timing diagram for explaining a method of operating an image pickup device according to another comparative example. When compared with the method of operating an image pickup device illustrated in FIG. 2, the method of operating an image pickup device illustrated in FIG. 3 does not read charges generated in the photoelectric converters $P_{1,1}, P_{1,2}, \ldots, P_{2n,2m}$ of all the rows by the vertical transfer paths $VCCD_1, VCCD_2, \ldots, VCCD_{2m}$. Instead, the method of FIG. 3 reads only charges generated in the photoelectric converters $P_{2,1}, P_{2,2}, \ldots, P_{2,2m}, P_{4,1}, P_{4,2}, \ldots, P_{2n,2m}$ which belong to some rows, for example, the even-numbered rows $R_2, R_4, \ldots, R_{2n}$, by the vertical transfer paths $VCCD_1$, $VCCD_2, \ldots, VCCD_{2m}$. Accordingly, data acquired by the method of operating an image pickup device illustrated in FIG. 3 has an HVGA-grade resolution if data obtained through the method of operating an image pickup device illustrated in FIG. 2 has a VGA-grade resolution.

However, since data is acquired from the charges generated in the photoelectric converters $P_{2,1}, P_{2,2}, \ldots, P_{2,2m}, P_{4,1}, P_{4,2}, \ldots, P_{2n,2m}$ which belong to the even-numbered rows $R_2, R_4, \ldots, R_{2n}$ in the method operating an image pickup device illustrated in FIG. 3, a time required to acquire the data corresponds to half a time required to obtain data in the method of operating an image pickup device illustrated in FIG. 2. As a result, while the method of operating an image pickup device illustrated in FIG. 2 displays a moving image of thirty frames per second on the display, the method of operating an image pickup device illustrated in FIG. 3 displays a moving image of sixty frames per second on the display, which disadvantageously results in loss of resources.

Figure 4:
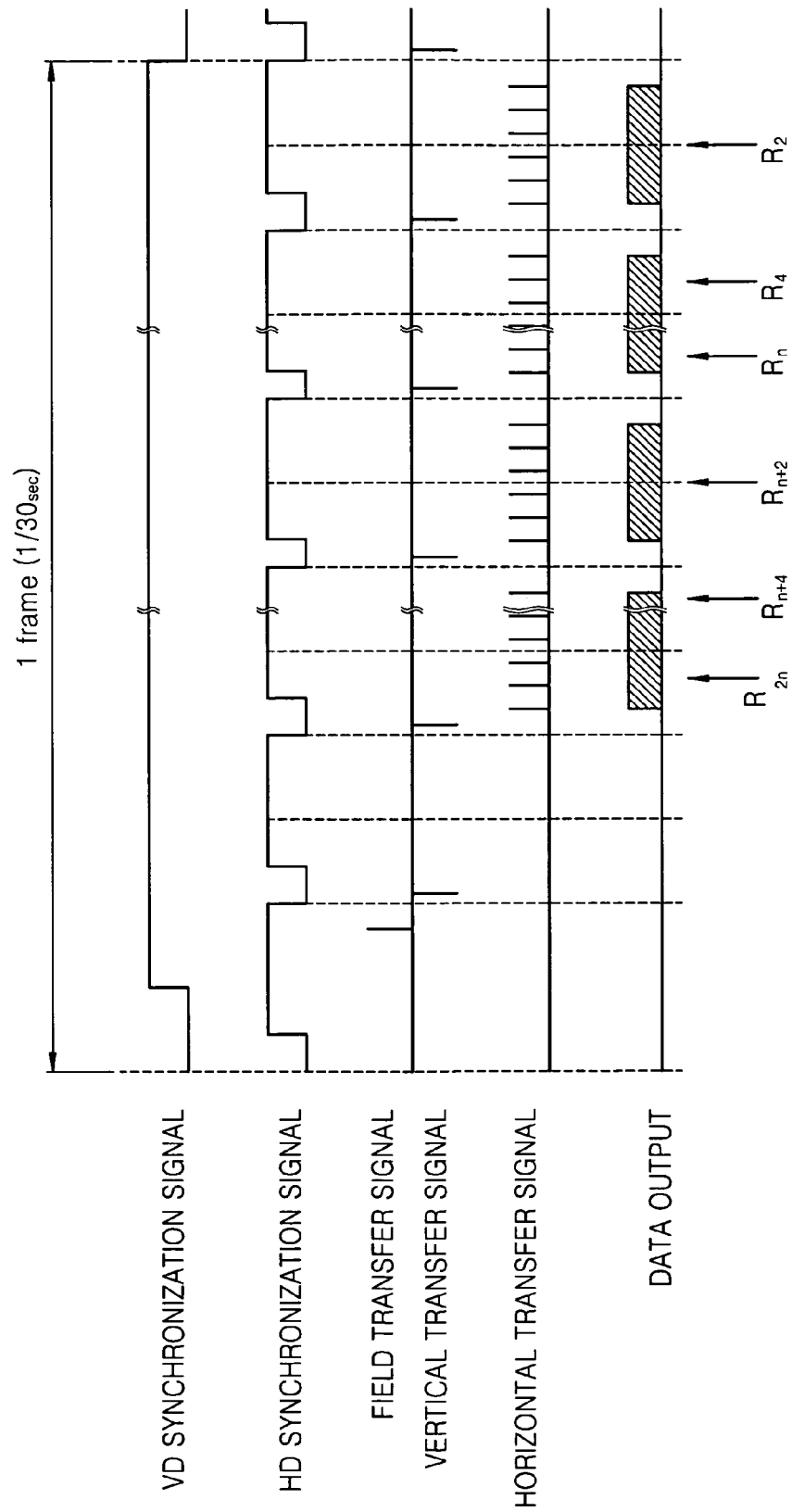

FIG. 4 is a timing diagram for explaining a method of operating an image pickup device according to another comparative example. When compared with the method of operating an image pickup device illustrated in FIG. 3, the method of operating an image pickup device illustrated in FIG. 4 changes a frequency and transfers charges transferred to the horizontal transfer path HCCD in the horizontal direction over a period of time twice a time required to transfer charges in the horizontal direction in the method of operating an image pickup device illustrated in FIG. 3. Accordingly, the method of operating an image pickup device illustrated in FIG. 4 displays a moving image of thirty frames per second on the display while acquiring data with an HVGA-grade resolution.

However, in the method of operating an image pickup device illustrated in FIG. 4, as a time required to transfer charges generated in photoelectric converters belonging to a row and transferred to the horizontal transfer path increases, a time during which charges generated in photoelectric converters belonging to another row and transferred to the vertical transfer paths exist in the vertical transfer paths also increases. If an incident light with high intensity is input to photoelectric converters, overflow charges generated caused by the incident light with high intensity flow out to the vertical transfer paths. Accordingly, when the time during which read charges exist in the vertical transfer paths is lengthened, the probability that the overflow charges are added to the read charges increases, and thus the probability that smear is generated in the real-time low-quality moving image displayed on the display of the digital photographing apparatus also increases.

Figure 5:
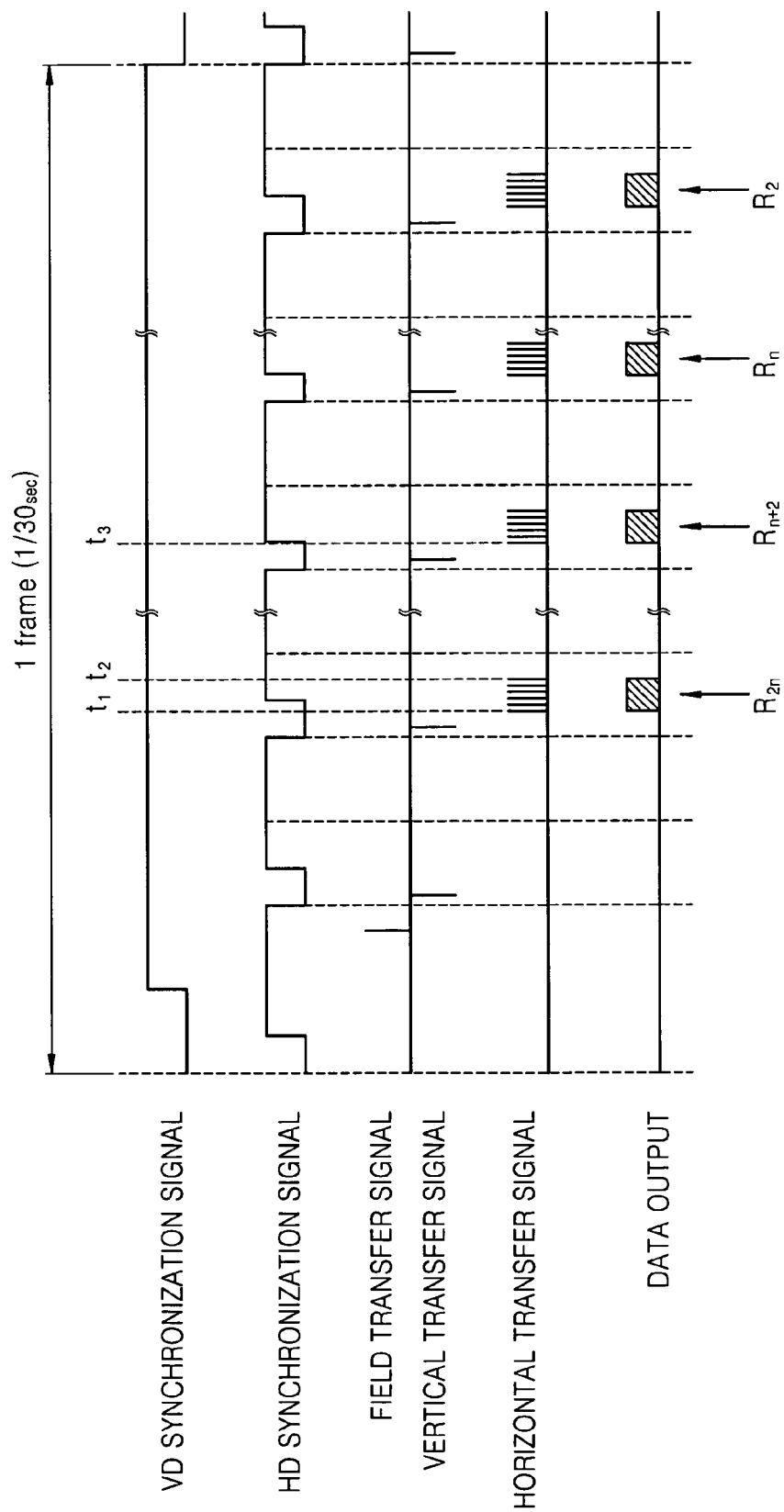

FIG. 5 is a timing diagram for explaining a method of operating an image pickup device according to another comparative example. According to the method operating an image pickup device illustrated in FIG. 5, the time required to transfer charges transferred to the horizontal transfer path in the horizontal direction does not increase, when compared with the method of operating an image pickup device illustrated in FIG. 4. That is, horizontal transfer signals are applied at the same time interval as that of the method of operating an image pickup device illustrated in FIG. 2 (and/or FIG. 3) for a period of time between a time $t_1$ and a time $t_2$, and then dummy horizontal transfer signals are provided between the time $t_2$ and a time $t_3$ (such that the horizontal transfer signals are not applied to the horizontal transfer path) to solve the problem of the method of operating an image pickup device illustrated in FIG. 4.

However, since the method of operating an image pickup device illustrated in FIG. 5 completes the transfer of charges transferred to the horizontal transfer path HCCD in the horizontal direction between the time $t_1$ and the time $t_2$, and then transfers charges existing in the vertical transfer paths $VCCD_1, VCCD_2, \ldots, VCCD_{2m}$ to the horizontal transfer path HCCD at the time $t_3$, the probability that overflow charges flow out to the vertical transfer paths $VCCD_1, VCCD_2, \ldots, VCCD_{2m}$ between the time $t_2$ and the time $t_3$ and are added to read charges increases. This increases the probability that smear is generated in the real-time low-quality moving image displayed on the display of the digital photographing apparatus.

Figure 6:
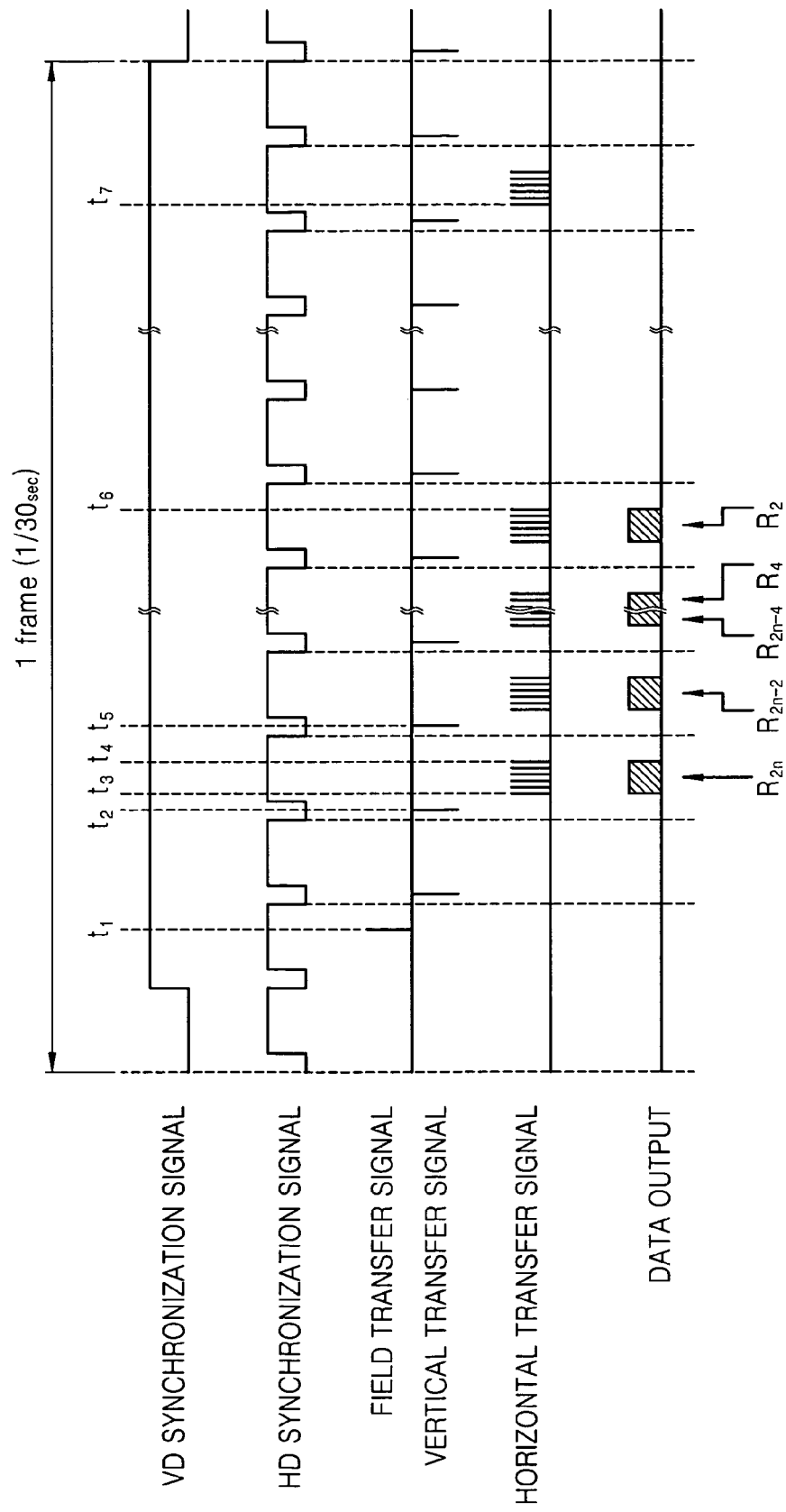
FIG. 6 illustrates a timing diagram explaining a method of operating an image pickup device according to an aspect of the present invention.

FIG. 6 is a timing diagram for explaining a method of operating an image pickup device according to an aspect of the present invention. According to the method of operating an image pickup device illustrated in FIG. 6, moving image information is acquired from charges generated in photoelectric converters belonging to some of the rows (e.g., a subset of photoelectric converters defining the even-numbered rows) of photoelectric converters of the image pickup device. An operation of acquiring information for each frame is explained.

As illustrated in FIG. 6, when charges generated in photoelectric converters belonging to some of the rows of the photoelectric converters of the image pickup device and read by the vertical transfer paths $VCCD_1, VCCD_2, \ldots, VCCD_{2m}$ are transferred to the horizontal transfer path HCCD, horizontal transfer signals are applied to the horizontal transfer path HCCD to transfer the charges in the horizontal direction.

More specifically, when a frame is started, a field transfer signal is applied at a time $t_1$ such that the vertical transfer paths $VCCD_1, VCCD_2, \ldots, VCCD_{2m}$ read only charges generated photoelectric converters belonging to some rows, for example, photoelectric converters $P_{2,1}, P_{2,2}, \ldots, P_{2,2m}, P_{4,1}, P_{4,2}, \ldots, P_{2n,2m}$ belonging to even-numbered columns $R_2, R_4, \ldots, R_{2n}$. Then, a vertical transfer signal is applied to the vertical transfer paths $VCCD_1, VCCD_2, \ldots, VCCD_{2m}$ at a time $t_2$ to transfer charges nearest to the horizontal transfer path HCCD to the horizontal transfer path HCCD. That is, charges generated in the photoelectric converters $P_{2n,1}, P_{2n,2}, \ldots, P_{2n,2m}$ belonging to the last row $R_{2n}$ of the image pickup device 30 are transferred to the horizontal transfer path HCCD. Multiple horizontal transfer signals are applied to the horizontal transfer path HCCD during a time period between a time $t_3$ and a time $t_4$ to transfer the charges transferred to the horizontal transfer path HCCD to the signal processor C. Although FIG. 6 illustrates that six horizontal transfer signals are applied to the horizontal transfer path HCCD for convenience of illustration, the number of horizontal transfer signals can correspond to the quantity of photoelectric converters (e.g., 2m) belonging to a single row. Of course, the number of horizontal transfer signals can correspond to the number of some of the photoelectric converters belonging to the single row. This is because the vertical transfer path VCCD may be configured to read charges from only a subset of the photoelectric converters belonging to the single row. In FIG. 6, the bottom portion of the diagram indicated by "DATA OUTPUT" conceptually represents time periods when electric signals such as data are output from the signal processor C.

Data is acquired from charges generated in photoelectric converters $P_{2n,1}, P_{2n,2}, \ldots, P_{2n,2m}$ corresponding to one row through the aforementioned operation, and then a vertical transfer signal is applied to the vertical transfer paths $VCCD_1, VCCD_2, \ldots, VCCD_{2m}$ at a time $t_5$ to transfer charges nearest to the horizontal transfer path HCCD to the horizontal transfer path HCCD. The charges nearest to the horizontal transfer path HCCD at the time $t_5$ correspond to charges generated in photoelectric converters $P_{2n-1,1}, P_{2n-1,2}, \ldots, P_{2n-1,2m}$ belonging to another row.

According to the above-described operation, required data is acquired. After a time $t_6$ when transfer of the charges generated in the photoelectric converters $P_{2,1}, P_{2,2}, \ldots, P_{2,2m}, P_{4,1}, P_{4,2}, \ldots, P_{2n,2m}$ belonging to the even-numbered rows $R_2, R_4, \ldots, R_{2n}$ in the horizontal direction through the horizontal transfer path HCCD is completed, the horizontal transfer signals are not applied to the horizontal transfer path HCCD during a predetermined period of time even though charges are transferred to the horizontal transfer path HCCD. The predetermined period of time may correspond to a time period between the time $t_6$ and the time $t_3$ of the next frame or a time period between the time $t_6$ and a time $t_7$ which will be explained hereinafter. It is also possible to apply the horizontal transfer signals to the horizontal transfer path HCCD for a short time even after the time $t_6$ when transfer of the charges generated in the photoelectric converters $P_{2,1}, P_{2,2}, \ldots, P_{2,2m}, P_{4,1}, P_{4,2}, \ldots, P_{2n,2m}$ belonging to the even-numbered rows $R_2, R_4, \ldots, R_{2n}$ in the horizontal direction through the horizontal transfer path HCCD is completed, and then prevent the horizontal transfer signals from being applied to the horizontal transfer path HCCD for a predetermined period of time even though charges are transferred to the horizontal transfer path HCCD.

Dummy horizontal transfer signals are provided for the predetermined period of time of a vertical data (VD) synchronization signal (such that horizontal transfer signals are not applied to the horizontal transfer path HCCD) in the method of operating an image pickup device according to the current embodiment of the present invention, while the dummy horizontal transfer signals are provided between the time $t_2$ and the time $t_3$ in each horizontal data (HD) synchronization signal (such that the horizontal transfer signals are not applied to the horizontal transfer path HCCD) in the method of operating an image pickup device illustrated in FIG. 5.

In the method of operating an image pickup device illustrated in FIG. 5, overflow charges generated during the time period between the time $t_2$ and the time $t_3$ increases the probability that smear is generated in the real-time low-quality moving image displayed on the display of the digital photographing apparatus. That is, in the method of operating an image pickup device illustrated in FIG. 5, when the signal processor C acquires data from charges generated in photoelectric converters belonging to even-numbered rows, dummy horizontal transfer signals are provided between when data is acquired from charges generated in photoelectric converters belonging to one of the even-numbered rows and when data is acquired from charges generated in photoelectric converters belonging to the next even-numbered row, and thus the probability that smear is generated in the real-time low-quality moving image displayed on the display of the digital photographing apparatus increases.

However, in the method operating an image pickup device according to the current embodiment of the present invention, when the signal processor C acquires data from charges generated in the photoelectric converters $P_{2,1}, P_{2,2}, \ldots, P_{2,2m}, P_{4,1}, P_{4,2}, \ldots, P_{2n,2m}$ belonging to the even-numbered rows $R_2, R_4, \ldots, R_{2n}$, dummy horizontal transfer signals are not provided between when data is acquired from charges generated in photoelectric converters belonging to one of the even-numbered rows and when data is acquired from charges generated in photoelectric converters belonging to the next even-numbered row. Accordingly, the probability that smear is generated in the real-time low-quality moving image displayed on the display of the digital photographing apparatus becomes remarkably lower than the probability that smear is generated when the method of operating an image pickup device illustrated in FIG. 5 is used.

In the case of the method operating an image pickup device according to the current embodiment of the present invention, a time during which charges exist in the vertical transfer paths $VCCD_1, VCCD_2, \ldots, VCCD_{2m}$ before the signal processor C acquires data is shorter than that of the method of operating an image pickup device illustrated in FIG. 4, and thus the probability that smear is generated in the real-time low-quality moving image displayed on the display of the digital photographing apparatus becomes remarkably lower than the probability that smear is generated when the method of operating an image pickup device illustrated in FIG. 4 is used. Furthermore, in the method operating an image pickup device according to the current embodiment of the present invention, the dummy horizontal transfer signals are provided after the signal processor C acquires data from the charges generated in the photoelectric converters $P_{2,1}, P_{2,2}, \ldots, P_{2,2m}, P_{4,1}, P_{4,2}, \ldots, P_{2n,2m}$ belonging to the even-numbered rows $R_2, R_4, \ldots, R_{2n}$. Accordingly, the method of operating an image pickup device according to the current embodiment of the present invention can maintain thirty frames per second, when compared with the method of operating an image pickup device illustrated in FIG. 3. That is, according to the method of operating an image pickup device according to the current embodiment of the present invention, a time period from when the frame is started to the time $t_6$ when the transfer of the charges generated in the photoelectric converters $P_{2,1}$, $P_{2,2}$, ..., $P_{2,2m}$, $P_{4,1}$, $P_{4,2}$, ..., $P_{2n,2m}$ belonging to the even-numbered rows $R_2$, $R_4$, ..., $R_{2n}$ and read by the vertical transfer paths $VCCD_1$, $VCCD_2$, ..., $VCCD_{2m}$ in the horizontal direction through the horizontal transfer path HCCD is completed can correspond to half a time from when the frame is started to when the frame is finished. The time period may not correspond to half the time from when the frame is started to when the frame is finished or may be longer or shorter than half the time.

Even after the charges read by the vertical transfer paths are transferred in the horizontal direction through the horizontal transfer path HCCD at the time $t_6$, the vertical transfer signal that instructs the charges existing in the vertical transfer paths $VCCD_1$, $VCCD_2$, ..., $VCCD_{2m}$ to be transferred to the horizontal transfer path HCCD can be applied to the vertical transfer paths $VCCD_1$, $VCCD_2$, ..., $VCCD_{2m}$ during the predetermined period of time (the time period between the time $t_6$ and the time $t_2$ of the next frame or the time period between the time $t_6$ and the time $t_7$ which will be explained later). In this case, horizontal transfer signals are not applied to the horizontal transfer path HCCD for the predetermined period of time even though charges are transferred to the horizontal transfer path HCCD, and thus generation of smear in the real-time low-quality moving image displayed on the display of the digital photographing apparatus can be reduced. Furthermore, it is also possible to apply the horizontal transfer signals to the horizontal transfer path HCCD even after the time $t_6$, and then prevent (or delay) the horizontal transfer signals from being applied to the horizontal transfer path HCCD for a predetermined period of time after the time $t_6$ even though charges are transferred to the horizontal transfer path HCCD. In this case, data is acquired from charges that may cause smear for a short time after the time $t_6$, and thus a small quantity of smear may be generated in the real-time low-quality moving image displayed on the display of the digital photographing apparatus. However, since the horizontal transfer signals are not applied to the horizontal transfer path HCCD for the predetermined period of time after the data is acquired from the charges that may cause smear for a short time after the time $t_6$, data is not acquired from charges that may cause smear after the data is acquired from the charges that may cause smear for a short time after the time $t_6$. Accordingly, the method of operating an image pickup device according to the current embodiment of the present invention remarkably reduces the quantity of generation of smear, compared to the methods of operating an image pickup device according to the aforementioned comparative examples. Therefore, a period in which the horizontal transfer signals are not applied to the horizontal transfer path HCCD for the predetermined period of time even though charges are transferred to the horizontal transfer path HCCD is required after the charges read by the vertical transfer paths $VCCD_1$, $VCCD_2$, ..., $VCCD_{2m}$ are transferred in the horizontal direction through the horizontal transfer path HCCD (after the time $t_6$). It is most preferable to prevent the horizontal transfer signals from being applied to the horizontal transfer path HCCD for the predetermined period of time after the time $t_6$.

When the vertical transfer signal that instructs the charges existing in the vertical transfer paths $VCCD_1$, $VCCD_2$, ..., $VCCD_{2m}$ to be transferred to the horizontal transfer path HCCD is applied to the vertical transfer paths $VCCD_1$, $VCCD_2$, ..., $VCCD_{2m}$ for the predetermined period of time (between the time $t_6$ and the time $t_7$) even after the charges read by the vertical transfer paths are transferred in the horizontal direction through the horizontal transfer path HCCD, charges that can be transferred to the horizontal transfer path HCCD may be overflow charges flowing out to the vertical transfer paths $VCCD_1$, $VCCD_2$, ..., $VCCD_{2m}$ during the time period between the time $t_6$ and the time $t_7$. Accordingly, it may be preferable to remove the charges existing in the horizontal transfer path HCCD before the frame is finished and the next frame is started, if required. These charges can be removed by applying horizontal transfer signals, which instruct charges transferred to the horizontal transfer path HCCD during a time when horizontal transfer signals are not applied to the horizontal transfer path HCCD (that is, after the time $t_6$ or after the lapse of a predetermined time from the time $t_6$) to be transferred in the horizontal direction, to the horizontal transfer path HCCD at the time $t_7$.

Figure 7:
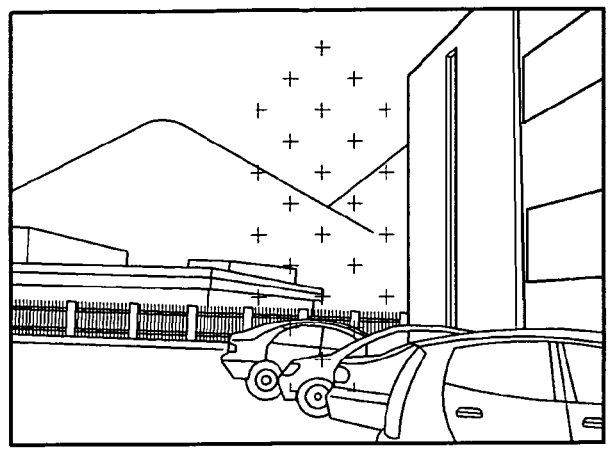
FIG. 7 is a frame image displayed on a display resulting from use of the conventional method FIG. 2.
Figure 8:
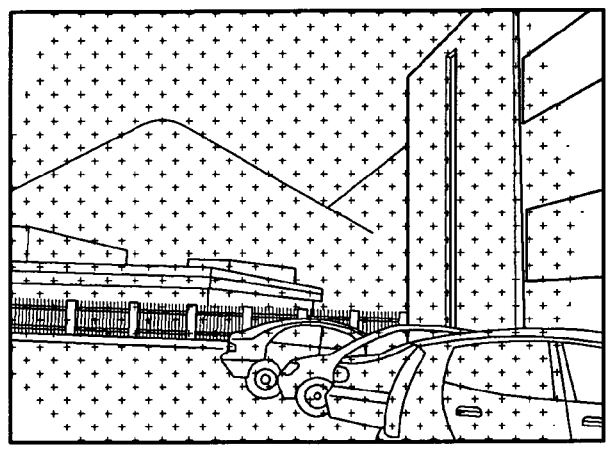
FIG. 8 is a frame image displayed on a display resulting from use of the conventional method of FIG. 5.
Figure 9:
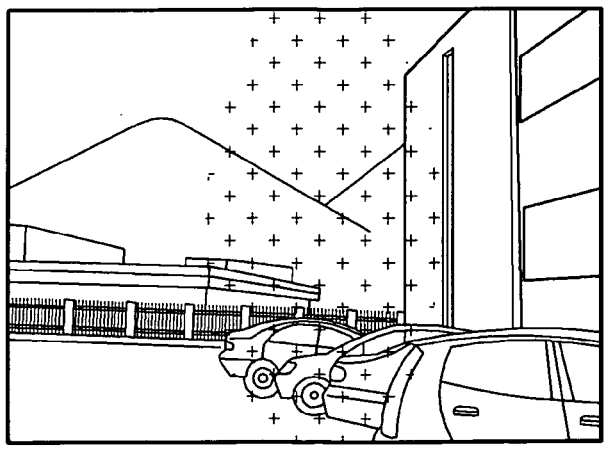
FIG. 9 is a frame image displayed on a display resulting from use of the method of operating an image pickup device illustrated in FIG. 6.

FIG. 7 is a frame image displayed on the display of the digital photographing apparatus using the method of operating an image pickup device illustrated in FIG. 2, FIG. 8 is a frame image displayed on the display using the method of operating an image pickup device illustrated in FIG. 5, and FIG. 9 is a frame image displayed on the display using the method of operating an image pickup device illustrated in FIG. 6. FIG. 7 represents a VGA-grade resolution in which thirty frames per second are displayed and FIGS. 8 and 9 represent an HVGA-grade resolution in which thirty frames per second are displayed. It can be appreciated from a comparison of FIG. 7 with FIG. 8 that the method of operating an image pickup device illustrated in FIG. 5 causes serious smear to remarkably deteriorate the quality of a real-time low-quality moving image while reducing unnecessary loss of resources as compared to the method of operating an image pickup device illustrated in FIG. 2. In addition, it can be appreciated from a comparison of FIG. 8 with FIG. 9 that the method of operating an image pickup device illustrated in FIG. 6 remarkably reduces smear to improve the quality of the real-time low-quality moving image as compared to the method of operating an image pickup device illustrated in FIG. 5. Furthermore, the method of operating an image pickup device illustrated in FIG. 6 decreases unnecessary loss of resources as compared to the method of operating an image pickup device illustrated in FIG. 2, and thus the method of operating an image pickup device illustrated in FIG. 6 can remarkably reduce power consumption. Moreover, it can be known from a comparison of FIG. 7 with FIG. 9 that the quality of the real-time low-quality moving image is not deteriorated by transferring charges of the even-numbered rows instead of transferring charges of all the rows.

The method of operating an image pickup device according to the present invention is not limited to the method of operating an image pickup device illustrated in FIG. 6. For example, horizontal transfer signals are applied to the horizontal transfer path HCCD in a case where charges generated in the photoelectric converters $P_{2,1}$, $P_{2,2}$, ..., $P_{2,2m}$, $P_{4,1}$, $P_{4,2}$, ..., $P_{2n,2m}$ belonging to the even-numbered rows $R_2$, $R_4$, ..., $R_{2n}$ and read by the vertical transfer paths $VCCD_1$, $VCCD_2$, ..., $VCCD_{2m}$ are transferred to the horizontal transfer path HCCD and the horizontal transfer signals are not applied to the horizontal transfer path HCCD for a predetermined period of time in a case where charges that are not read by the vertical transfer paths $VCCD_1$, $VCCD_2$, ..., $VCCD_{2m}$ are transferred to the horizontal transfer path HCCD, and thus a real-time low-quality moving image with remarkably reduced smear can be displayed on the display of the digital photographing apparatus while loss of resources is prevented as does the method of operating an image pickup device according to the above-described embodiment. Here, the charges that are not read by the vertical transfer paths $VCCD_1$, $VCCD_2$, ..., $VCCD_{2m}$ correspond to overflow charges, for example. While charges generated in photoelectric converters are read by vertical transfer paths according to a field transfer signal, overflow charges are not read by the vertical transfer paths according to the field transfer signal and they are generated in the photoelectric converters and flow out to the vertical transfer paths. Accordingly, the overflow charges are distinguished from the charges ready by the vertical transfer paths.

It is also possible to determine that the horizontal transfer signals are not applied to the horizontal transfer path HCCD for a predetermined period of time when only charges that are not read by the vertical transfer paths $VCCD_1$, $VCCD_2$, ..., $VCCD_{2m}$ are transferred to the horizontal transfer path HCCD. This is because data must be acquired from charges read by the vertical transfer paths $VCCD_1$, $VCCD_2$, ..., $VCCD_{2m}$ to which overflow charges have been added, in order to display a real-time low-quality moving image in a case where the overflow charges are added to the charges read by the vertical transfer paths $VCCD_1$, $VCCD_2$, $VCCD_{2m}$. However, in a case where only charges that are not read by the vertical transfer paths $VCCD_1$, $VCCD_2$, ..., $VCCD_{2m}$ are transferred to the horizontal transfer path HCCD, these charges can not provide data required to display a real-time low-quality moving image, and thus it is preferable that these charges are not transferred in the horizontal direction. The charges that are not read by the vertical transfer paths $VCCD_1$, $VCCD_2$, ..., $VCCD_{2m}$ are transferred to the horizontal transfer path HCCD because the vertical transfer signal, which instructs charges existing in the vertical transfer paths $VCCD_1$, $VCCD_2$, ..., $VCCD_{2m}$ to be transferred to the horizontal transfer path HCCD, is applied to the vertical transfer paths $VCCD_1$, $VCCD_2$, ..., $VCCD_{2m}$ for the predetermined period of time. This is for the purpose of removing overflow charges existing in the vertical transfer paths $VCCD_1$, $VCCD_2$, ..., $VCCD_{2m}$ to the horizontal transfer path HCCD. And then, the horizontal transfer signal is applied to the horizontal transfer path HCCD at the time $t_7$ of FIG. 6 before the frame is finished to remove the overflow charges from the horizontal transfer path HCCD.

Figure 10:
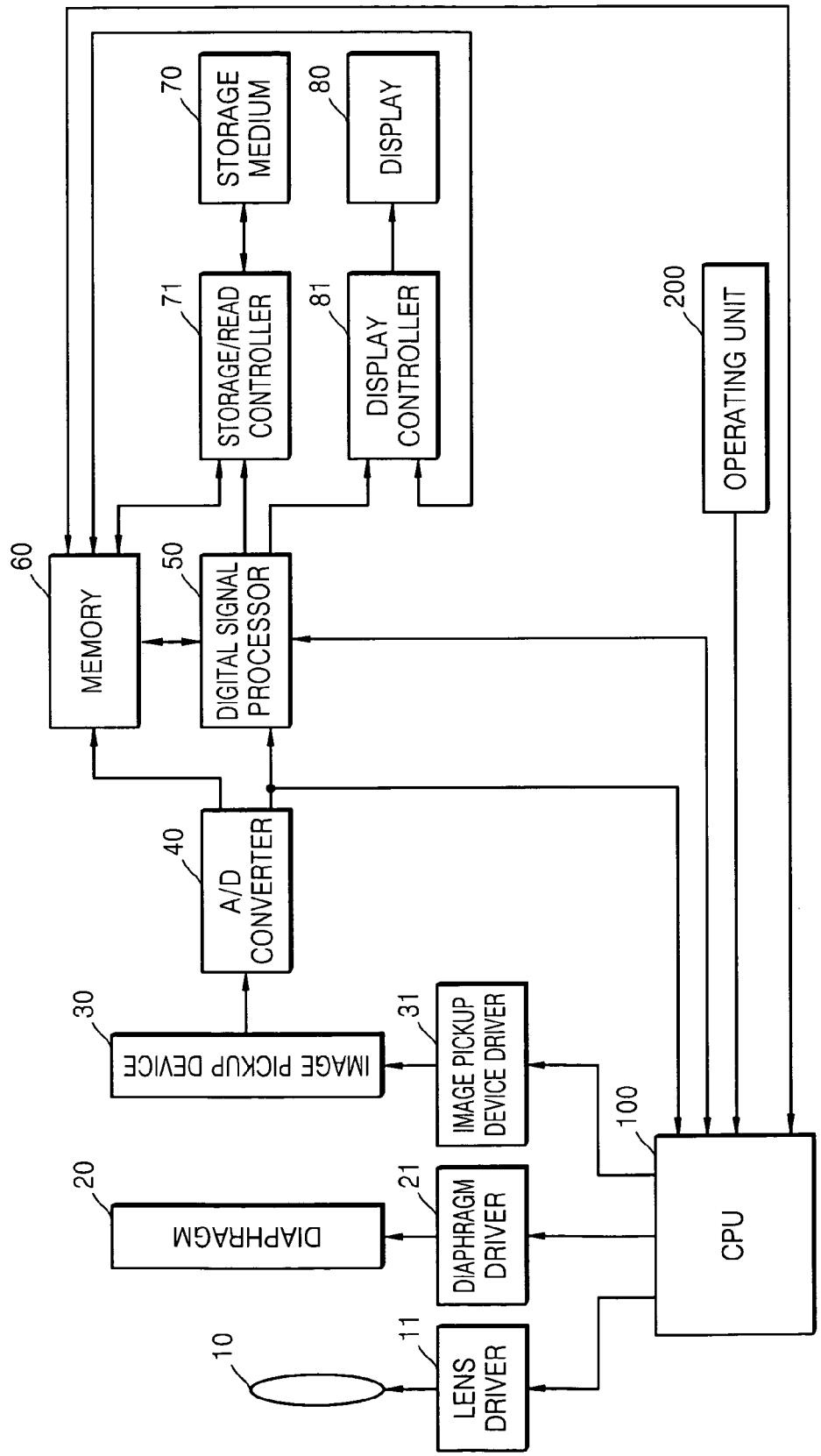
FIG. 10 illustrates a digital photographing apparatus according to another aspect of the present invention.

FIG. 10 illustrates an example digital photographing apparatus according to an aspect of the present invention. Referring to FIG. 10, the operation of the digital photographing apparatus is controlled by a CPU 100. The digital photographing apparatus includes an operating unit 200 having a key, button, switch or other type of actuator that generates an electric signal according to an instruction from a user. The electric signal is transferred to the CPU 100 such that the CPU 100 can control the digital photographing apparatus according to the electric signal.

In a photographing mode, as the electric signal is applied to the CPU 100, the CPU 100 controls a lens driver 11, a diaphragm driver 21, and an image pickup device driver 31, and thus the position of a lens 10, a degree to which a diaphragm 20 is opened, and the operation of the image pickup device 30 are controlled. The image pickup device 30 generates data from light input thereto. The configuration of the image pickup device 30 has been described with reference to FIG. 1. An analog-to-digital converter 40 converts analog data output from the image pickup device 30 into digital data. The analog-to-digital converter 40 may not be required according to a configuration of the image pickup device 30.

The data output from the image pickup device 30 can be applied to a digital signal processor 50 via a memory 60 or input to the digital signal processor 50 without passing through the memory 60. In some instances, the data can be input to the CPU 100. The memory 60 may include a read only memory (ROM) and/or a random access memory (RAM). The digital signal processor 50 can perform digital signal processing such as gamma correction and white balance adjustment.

Data output from the digital signal processor 50 is transmitted to a display controller 81 directly or via the memory 60. The display controller 81 controls a display 80 to display a still image and/or a (real-time) low-quality moving image on the display 80. In addition, the data output from the digital signal processor 50 is input to a storage/read controller 71 directly or via the memory 60. The storage/read controller 71 stores data in a storage medium 70 automatically or according to a signal from the user. The storage/read controller 71 can read data stored in the storage medium 70 and apply the read data to the display controller 81 through the memory 60 or through another path such that the display 80 can display a still image and/or a low-quality moving image. The storage medium 70 can be a separable component (e.g., a flash memory card) or a built-in component of the digital photographing apparatus.

The image pickup device driver 31 drives the image pickup device 30 as described above with respect to FIG. 6. Accordingly, smear generated in the real-time low-quality moving image displayed on the display 80 can be remarkably reduced and unnecessary loss of resources of the digital photographing apparatus can be effectively prevented.

Figure 11:
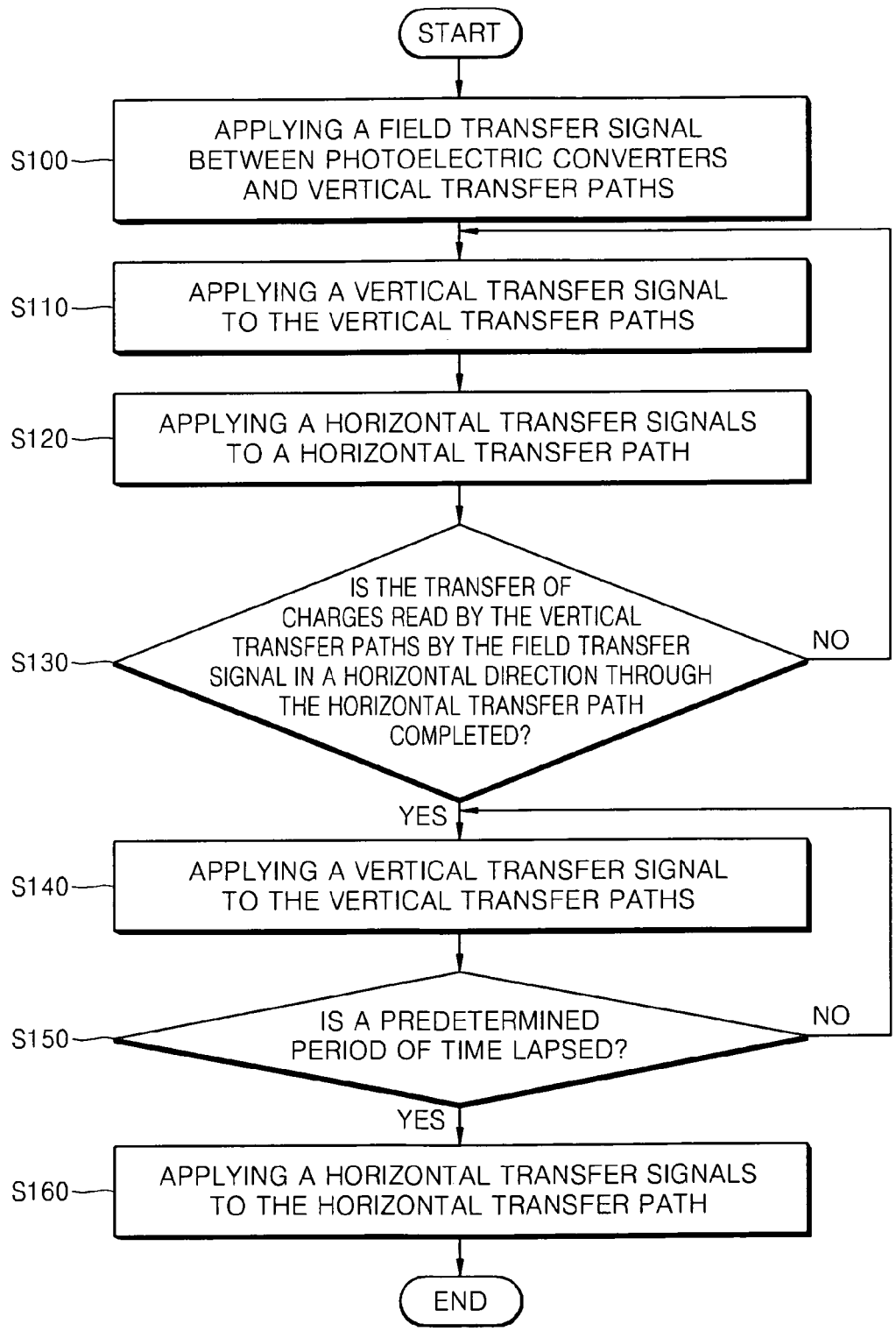
FIG. 11 is a flowchart corresponding to the timing diagram in FIG. 6.

FIG. 11 is a flowchart corresponding to the timing diagram in FIG. 6. In FIG. 11, step S100 includes applying a field transfer signal, which instructs the charges generated in the photoelectric converters belonging to the subset of rows of the photoelectric converters to be read by the vertical transfer paths, between the photoelectric converters belonging to the some of the rows and the vertical transfer paths. Step S110 includes applying a vertical transfer signal, which instructs charges nearest to the horizontal transfer path among the charges transferred to the vertical transfer paths to be transferred to the horizontal transfer path, to the vertical transfer paths. Step S120 includes applying the horizontal transfer signals, which instruct the charges transferred to the horizontal transfer path to be transferred in the horizontal direction, to the horizontal transfer path. Step S130 in FIG. 11 includes repeating step S110 and step S120 until the transfer of the charges read by the vertical transfer paths in step S100 in the horizontal direction through the horizontal transfer path is completed.

Steps S140 and S150 in FIG. 11 illustrate that after completing the transfer of the charges read by the vertical transfer paths in the horizontal direction through the horizontal transfer path, a period is provided in which the horizontal transfer signals are not applied to the horizontal transfer path for the predetermined period of time even though charges are transferred to the horizontal transfer path while the vertical transfer signal, which instructs the charges read by the vertical transfer paths to be transferred to the horizontal transfer path, is applied to the vertical transfer paths for the predetermined period of time.

Step S160 in FIG. 11 illustrates that after the predetermined period of time during which the horizontal transfer signals are not applied to the horizontal transfer path while charges are transferred to the horizontal transfer path has elapsed, horizontal transfer signals are applied, which instruct the charges transferred to the horizontal transfer path during the period in which the horizontal transfer signals are not applied to the horizontal transfer path, to be transferred in the horizontal direction, to the horizontal transfer path.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of operating an image pickup device including photoelectric converters arranged in a matrix and which generate charges from incident light, vertical transfer paths arranged on one side of each of columns of the photoelectric converters for reading charges generated in the photoelectric converters and transferring the read charges in a vertical direction, and a horizontal transfer path electrically connected to one end of each of the vertical transfer paths for transferring the charges transferred from the vertical transfer paths in a horizontal direction, the method comprising:
for each frame in a mode of acquiring moving image information from charges generated in photoelectric converters belonging to a subset of rows of the photoelectric converters of the image pickup device,
(a) applying during a first portion of each frame horizontal transfer signals, which instruct the charges generated in the photoelectric converters belonging to the subset of rows of the photoelectric converters and read by the vertical transfer paths to be transferred in the horizontal direction, to the horizontal transfer path when the charges are transferred to the horizontal transfer path; and
(b) during a second portion of each frame not applying the horizontal transfer signals to the horizontal transfer path while charges are transferred to the horizontal transfer path, after completing transfer of the charges generated in the photoelectric converters belonging to the subset of rows of the photoelectric converters and read by the vertical transfer paths are transferred in the horizontal direction through the horizontal transfer path, wherein the first and second portions are non-overlapping and collectively represent substantially a time duration of the frame.

2. The method of claim 1, wherein step (a) comprises:
(a1) applying a field transfer signal, which instructs the charges generated in the photoelectric converters belonging to the subset of rows of the photoelectric converters to be read by the vertical transfer paths, between the photoelectric converters belonging to the some of the rows and the vertical transfer paths;
(a2) applying a vertical transfer signal, which instructs charges nearest to the horizontal transfer path among the charges transferred to the vertical transfer paths to be transferred to the horizontal transfer path, to the vertical transfer paths; and
(a3) applying the horizontal transfer signals, which instruct the charges transferred to the horizontal transfer path to be transferred in the horizontal direction, to the horizontal transfer path,
wherein steps (a2) and (a3) are repeated until the transfer of the charges read by the vertical transfer paths in the step (a1) in the horizontal direction through the horizontal transfer path is completed.

3. The method of claim 2, wherein the step (b) comprises, after completing the transfer of the charges read by the vertical transfer paths in the horizontal direction through the horizontal transfer path, not applying the horizontal transfer signals to the horizontal transfer path during the second portion even though charges are transferred to the horizontal transfer path while the vertical transfer signal, which instructs the charges read by the vertical transfer paths to be transferred to the horizontal transfer path, is applied to the vertical transfer paths during the second portion.

4. The method of claim 3, further comprising (c) after the second portion in step (b) has elapsed, applying horizontal transfer signals, which instruct the charges transferred to the horizontal transfer path during the period in which the horizontal transfer signals are not applied to the horizontal transfer path, to be transferred in the horizontal direction, to the horizontal transfer path.

5. The method of claim 1, further comprising (c) after the second portion in step (b) has elapsed, applying horizontal transfer signals, which instruct the charges transferred to the horizontal transfer path during the period in which the horizontal transfer signals are not applied to the horizontal transfer path, to be transferred in the horizontal direction, to the horizontal transfer path.

6. A method of operating an image pickup device including photoelectric converters arranged in a matrix and which generate charges from incident light, vertical transfer paths arranged on one side of each of columns of the photoelectric converters for reading charges generated in the photoelectric converters and transferring the read charges in a vertical direction, and a horizontal transfer path electrically connected to one end of each of the vertical transfer paths for transferring the charges transferred from the vertical transfer paths in a horizontal direction, the method comprising:
for each frame in a mode of acquiring moving image information from charges generated in photoelectric converters belonging to a subset of rows of the photoelectric converters of the image pickup device,
during a first portion of each frame when the charges generated in the photoelectric converters belonging to the subset of rows of the photoelectric converters and read by the vertical transfer paths are transferred to the horizontal transfer path, horizontal transfer signals which instruct the charges to be transferred in the horizontal direction are applied to the horizontal transfer path, and during a second portion of each frame when charges that are not read by the vertical transfer paths are transferred to the horizontal transfer path, the horizontal transfer signals are not applied to the horizontal transfer path, wherein the first and second portions are non-overlapping and collectively represent substantially all of the frame.

7. The method of claim 6, wherein the horizontal transfer signals are not applied to the horizontal transfer path during the second portion when only the charges that are not read by the vertical transfer paths are transferred to the horizontal transfer path.

8. The method of claim 6, wherein the charges generated in the photoelectric converters belonging to the subset of rows of the photoelectric converters and read by the vertical transfer paths are transferred to the horizontal transfer path by applying a vertical transfer signal, which instructs charges nearest to the horizontal transfer path among the charges transferred to the vertical transfer paths to be transferred to the horizontal transfer path, to the vertical transfer paths.

9. The method of claim 6, wherein the charges that are not read by the vertical transfer paths are transferred to the horizontal transfer path by applying a vertical transfer signal, which instructs charges existing in the vertical transfer paths to be transferred to the horizontal transfer path, to the vertical transfer paths during the second portion.

10. The method of claim 6, further comprising after the second portion, applying horizontal transfer signals, which instruct the charges transferred to the horizontal transfer path to be transferred in the horizontal direction, to the horizontal transfer path.

11. A digital photographing apparatus comprising:
a lens through which light passes;
an image pickup device including photoelectric converters arranged in a matrix and which generate charges from light passing through the lens, vertical transfer paths arranged on one side of each of columns of the photoelectric converters for reading charges generated in the photoelectric converters and transferring the read charges in a vertical direction, a horizontal transfer path electrically connected to one end of each of the vertical transfer paths for transferring the charges transferred from the vertical transfer paths in a horizontal direction, and a signal output unit converting the charges transferred from the horizontal transfer path into an electric signal;
a signal processor processing the electric signal output from the signal output unit of the image pickup device; and
an image pickup device driver controlling the operation of the image pickup device,
wherein, for each frame in a mode of acquiring moving image information from the charges generated in the photoelectric converters belonging to a subset of rows of the photoelectric converters of the image pickup device, the image pickup device driver controls the operation of the image pickup device by applying, during a first portion of the frame, horizontal transfer signals, which instruct the charges generated in photoelectric converters belonging to the subset of rows of the photoelectric converters and read by the vertical transfer paths to be transferred in the horizontal direction, to the horizontal transfer path when the charges are transferred to the horizontal transfer path; and during a second portion of the frame when the horizontal transfer signals are not applied to the horizontal transfer path while charges are transferred to the horizontal transfer path after the charges generated in the photoelectric converters belonging to the subset of rows of the photoelectric converters and read by the vertical transfer paths are transferred in the horizontal direction through the horizontal transfer path, wherein the first and second portions are non-overlapping and collectively represent substantially the duration of the frame.

12. The digital photographing apparatus of claim 11, wherein the step of applying horizontal transfer signals comprises:
first applying a field transfer signal, which instructs the charges generated in the photoelectric converters belonging to the subset of rows of the photoelectric converters to be read by the vertical transfer paths, between the photoelectric converters belonging to the subset of rows and the vertical transfer paths;
second applying a vertical transfer signal, which instructs charges nearest to the horizontal transfer path among the charges transferred to the vertical transfer paths to be transferred to the horizontal transfer path, to the vertical transfer paths; and
third applying the horizontal transfer signals, which instruct the charges transferred to the horizontal transfer path to be transferred in the horizontal direction, to the horizontal transfer path,
wherein the second and third applying steps are repeated until the transfer of the charges read by the vertical transfer paths during the first applying step in the horizontal direction through the horizontal transfer path is completed.

13. The digital photographing apparatus of claim 12, wherein the during the second portion, after completing the transfer of the charges read by the vertical transfer paths in the horizontal direction through the horizontal transfer path, not applying the horizontal transfer signals to the horizontal transfer path during the second portion even though charges are transferred to the horizontal transfer path while the vertical transfer signal, which instructs the charges read by the vertical transfer paths to be transferred to the horizontal transfer path, is applied to the vertical transfer paths during the second portion.

14. The digital photographing apparatus of claim 11, wherein the image pickup device driver further controls the operation of the image pickup device by the step of, after the second portion has elapsed, applying horizontal transfer signals, which instruct the charges transferred to the horizontal transfer path to be transferred in the horizontal direction, to the horizontal transfer path.

15. A digital photographing apparatus comprising:
a lens through which light passes;
an image pickup device including photoelectric converters arranged in a matrix and which generate charges from incident light input through the lens into charges, vertical transfer paths arranged on one side of each of columns of the photoelectric converters for reading charges generated in the photoelectric converters and transferring the read charges in a vertical direction, a horizontal transfer path electrically connected to one end of each of the vertical transfer paths for transferring the charges transferred from the vertical transfer paths in a horizontal direction, and a signal output unit converting the charges transferred from the horizontal transfer path into an electric signal;
a signal processor processing the electric signal output from the signal output unit of the image pickup device; and
an image pickup device driver controlling operation of the image pickup device,
wherein, for each frame in a mode of acquiring moving image information from charges generated in photoelectric converters belonging to a subset of rows of the photoelectric converters of the image pickup device, during a first portion of the frame when the charges generated in the photoelectric converters belonging to the subset of rows of the photoelectric converters and read by the vertical transfer paths are transferred to the horizontal transfer path, the image pickup device driver applies horizontal transfer signals, which instruct the charges to be transferred in the horizontal direction, to the horizontal transfer path, and during a second portion of the frame when charges that are not read by the vertical transfer paths are transferred to the horizontal transfer path, the image pickup device drive does not apply the horizontal transfer signals to the horizontal transfer path during the second portion, wherein the first and second portions are non-overlapping and collectively represent substantially a length of the frame.

16. The digital photographing apparatus of claim 15, wherein the image pickup device driver does not apply the horizontal transfer signals to the horizontal transfer path during the second portion when only the charges that are not read by the vertical transfer paths are transferred to the horizontal transfer path.

17. The digital photographing apparatus of claim 15, wherein the charges generated in the photoelectric converters belonging to the subset of rows and read by the vertical transfer paths are transferred to the horizontal transfer path by applying a vertical transfer signal, which instructs charges nearest to the horizontal transfer path among the charges transferred to the vertical transfer paths to be transferred to the horizontal transfer path, to the vertical transfer paths.

18. The digital photographing apparatus of claim 15, wherein the charges that are not read by the vertical transfer paths are transferred to the horizontal transfer path by applying a vertical transfer signal, which instructs charges existing in the vertical transfer paths to be transferred to the horizontal transfer path, to the vertical transfer paths during the second portion.

19. The digital photographing apparatus of claim 15, wherein after the second portion has elapsed, the image pickup device driver applies horizontal transfer signals, which instruct the charges transferred to the horizontal transfer path during the second period in which the horizontal transfer signals are not applied to the horizontal transfer path, to be transferred in the horizontal direction, to the horizontal transfer path.

* * * * *